United States Patent [19]
Teeri

[11] 3,836,195
[45] Sept. 17, 1974

[54] BELLEVILLE DISK SPRING PILLAR ASSEMBLY

[76] Inventor: Niilo Heikki Teeri, Korppaantie 8 D, 00300 Helsinki 30, Finland

[22] Filed: Jan. 13, 1972

[21] Appl. No.: 217,479

[30] Foreign Application Priority Data
Jan. 13, 1971 Finland .................................. 80/71

[52] U.S. Cl. ................................................ 267/162
[51] Int. Cl. ........................................... F16k 1/34
[58] Field of Search .................................... 267/162

[56] References Cited
UNITED STATES PATENTS

| | | |
|---|---|---|
| 2,655,935 | 10/1953 | Kinzbach ........................... 267/162 |
| 2,776,851 | 1/1957 | Heinrich ............................ 267/162 |
| 3,010,713 | 11/1961 | Turkovich ......................... 267/162 |
| 3,127,157 | 3/1964 | Webb ................................. 267/162 |

*Primary Examiner*—James B. Marbert
*Attorney, Agent, or Firm*—Schuyler, Birch, Swindler, McKie & Beckett

[57] ABSTRACT

In a spring pillar assembled from planelike or slightly conical Belleville disk springs the Belleville disk springs have been bound into spring pillars one by one in packages alternately at their outer and inner rims with binding rings receiving tensile and pressure loads.

9 Claims, 11 Drawing Figures

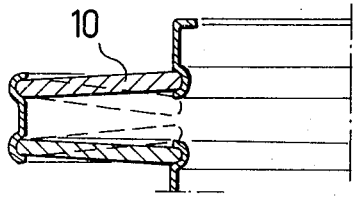
Fig. 6
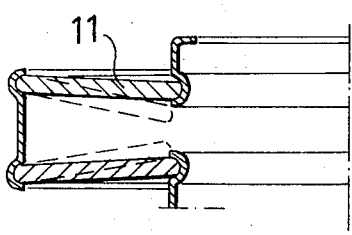
Fig. 7
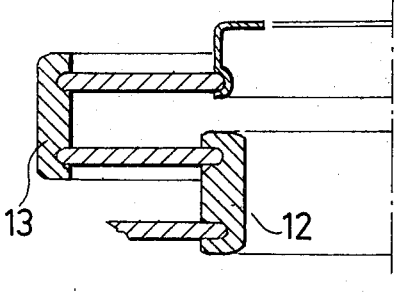
Fig. 8
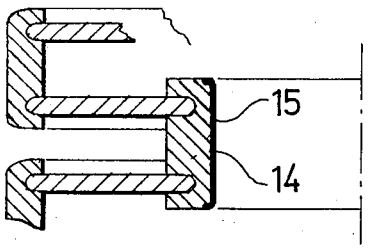
Fig. 9
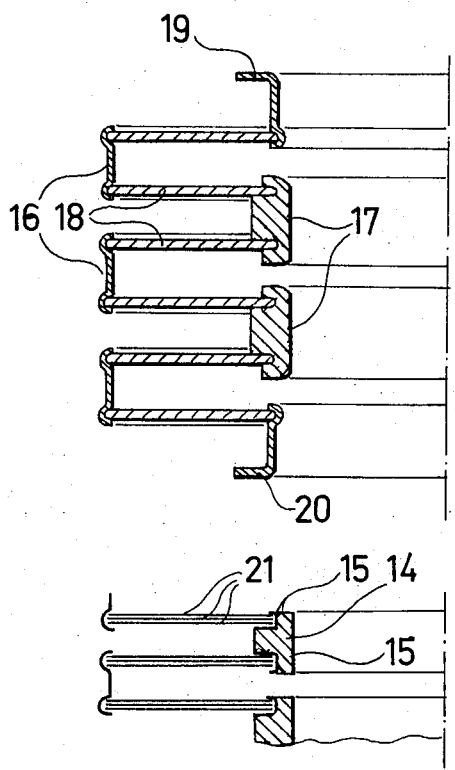
Fig. 10
Fig. 11

BELLEVILLE DISK SPRING PILLAR ASSEMBLY

BACKGROUND OF THE INVENTION

1. Field of the Invention

The invention relates to the field of spring pillars assembled from Belleville disk springs.

2. Description of the Prior Art

Belleville disk springs are characterized by a great spatial efficiency, when the efficiency of the spring is compared with the space it requires in the construction. The deformation curve of individual Belleville disk springs of standard make is usually almost linear or somewhat degressive. There are also Belleville disk springs of standard make which have an almost constant spring force within certain deformation areas. They are used, for example, as springs in release mechanisms and in the installation of ball bearings. Other types of deformation curves can also be obtained with Belleville disk springs. An example is the progressive spring in which the spring force grows progressively when deformation increases. A progressive deformation curve can be obtained with, for example, a planelike Belleville disk spring, when the ratio of the free height $h$ of a spring with a rectangular cross section to the thickness of the material $s$ is zero, or $h/s = 0$. A progressive deformation area can also be obtained with slightly conical Belleville disk springs, when the deformation surpasses the free height $h$. A progressive spring is advantageous in, for example, vehicles. Belleville disk springs like this have, however, not been used in them so far, mainly owing to the unsuitability of the so far used spring pillar constructions for this purpose.

SUMMARY OF THE INVENTION

According to the invention tensile and pressure receiving binding rings are provided to alternately bind together the outer and inner rims of each Belleville disk spring or package of Belleville disk springs to the corresponding rim of one adjacent spring or package.

These binding rings bind the Belleville disk springs into one assembly which can be loaded in both directions, while they make it possible to assemble a spring pillar from planelike or slightly conical Belleville disk springs so that advantage can be taken of their progressive deformation area.

BRIEF DESCRIPTION OF THE DRAWINGS

FIGS. 1 – 11 show a few examples according to the invention. FIG. 1 shows a cross section of an unloaded spring pillar assembled from individual planelike Belleville disk springs, FIG. 2 shows the same in a depressed state, and FIG. 3 the same seem from above. FIGS. 4 – 11 mainly show in more detail partial sections of various solutions for the binding.

DESCRIPTION OF THE PREFERRED EMBODIMENTS

Figure 1:
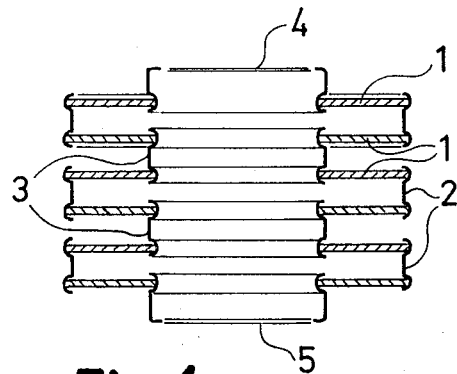
Figure 2:
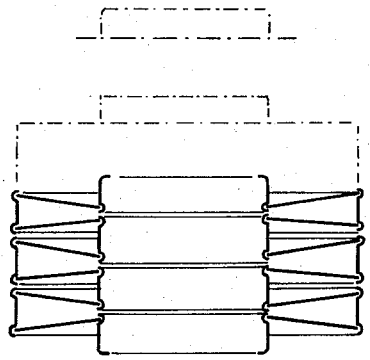
Figure 3:
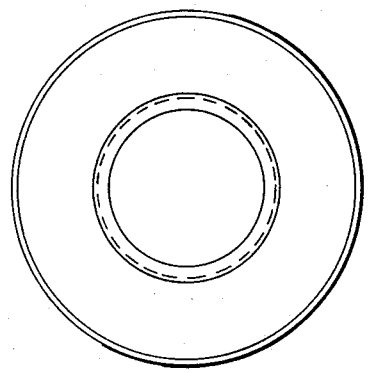

Besides a progressive deformation curve, the Belleville disk spring pillar according to FIGS. 1, 2, and 3 is characterized in that it works as both a pressure spring and a tension spring. Planelike Belleville disk springs 1 in the spring pillar have been bound into one assembly with binding rings 2 at their outer rims and with binding rings 3 at their inner rims. The topmost (4) and the undermost (5) of the binding rings at the inner rims work at the same time as receivers of outside loads.

In FIG. 2, which shows, in a depressed state, a spring pillar according to FIG. 1, both the effective length of the pillar and its length under tensile load are indicated with broken lines.

Figure 4:
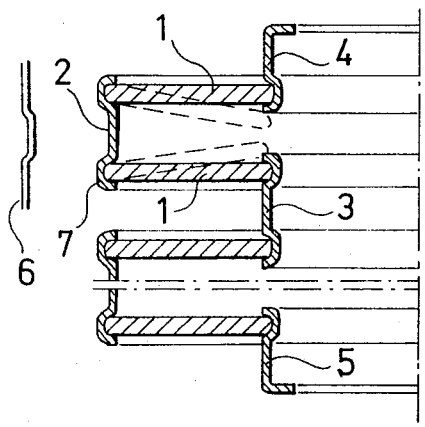

FIG. 4 shows a partial section of a solution in which planelike Belleville disk springs 1 have been bound together with binding rings made of steel plate rings. The assembling of binding rings 2 of the outer rim and Belleville disk springs 1 can be carried out so that a steel plate ring with a cross section according to 6 is mangled onto the outer rims of the Belleville disk springs, creating holding flange 7. The outer rims of Belleville disk springs 1 have been rounded to diminish the wearing caused by the spring movement. As for binding rings 3, 4, and 5 at the inner rims, the assembling can follow the same principle as at the outer rims. The shaping of the inner rims, rounding, in this case, is mainly to level the stress peak at the inner rim of a Belleville disk spring and thus to improve the dynamic load capacity, even though the wearing factor also has an effect on the shaping of the rim. The dynamic load capacity of a Belleville disk spring can also be increased by shaping the inner rim in other ways, for example, by slanting it or with a combination of slanting and rounding.

Figure 5:
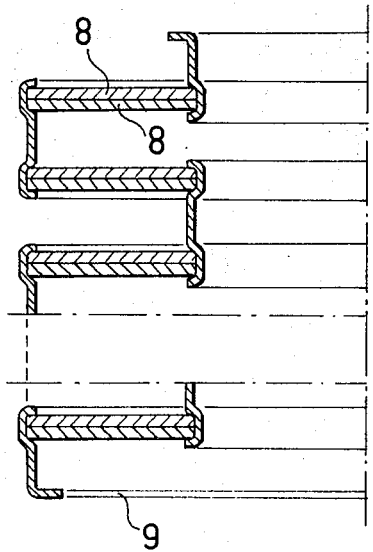

FIG. 5 shows a solution somewhat similar to that in FIG. 4, but in this case the spring pillar has been assembled from packages of two Belleville disk springs 8, in which case the bearing capacity of the spring pillar is doubled. In this way, the spring pillar can be assembled from packages of even several disk springs. Undermost binding ring 9 which receives the load has been placed at the outer rim in this example.

FIG. 6 shows a partial section of a spring pillar assembled from slightly conical Belleville disk springs 10. When the ratio of the free height to the thickness of the material is suitably small, the Belleville disk spring is characterized first by a slightly degressive deformation area, which causes a degressive growth of the spring force within certain load limits, whereafter the spring becomes progressive when the deformation surpasses the free height and the spring force grows faster than the deformation. Advantage can be taken of this factor in certain cases. The broken lines show the deformation of a Belleville disk spring caused by a full load.

FIG. 7 shows a partial section of a spring pillar assembled from slightly conical Belleville disk springs 11, in which the effective length of a Belleville disk spring is negative, or the conical disk spring has been fitted to the spring pillar so that the conicity increases immediately under outer pressure load. In this way, a steeper progressive deformation curve is obtained when the spring is pressed, even though the distribution of stress in the Belleville disk spring is less advantageous than in the other cases described above.

A Belleville disk spring pillar according to the invention can also be created so that the binding rings or part of the binding rings have been made from an elastic material, such as rubber or synthetic rubber. FIG. 8 shows a partial section of a spring pillar solution in which binding rings 12 and 13 of the inner and outer rims have been made from an elastic material. In FIGS. 9 and 11, inner ring 14 has been reinforced with metal ring 15, which has been vulcanized to elastic part 14.

FIG. 10 shows a partial section of a Belleville disk spring pillar, in which outer rings 15 are of, for example, metal, inner rings 17 of an elastic material, and the end rings 19 and 20 of, for example, metal. As for the manufacturing techniques, elastic binding ring 17 can be, for example, vulcanized to Belleville disk springs or disk spring packages 18, after which outer metallic binding rings 16 are mangled onto the outer rims. FIG. 11 shows a partial section of a similar spring pillar, but the spring pillar has been assembled from packages of three Belleville disk springs.

What I claim is:

1. In a Belleville spring pillar assembly, including a plurality of Belleville disk springs having inner and outer rims, the improvement comprising a plurality of binding rings having holding flanges comprising means for securing the rims of said disks in a tensile and pressure load transmitting relationship, alternate ones of said binding rings securing the inner rims and next the outer rims of said disks whereby tensile or pressure loads are absorbed by said spring.

2. The improved Belleville disk spring pillar assembly of claim 1, wherein at least a part of the binding rings comprises an elastic material.

3. The improved Belleville disk spring pillar assembly of claim 2, wherein the binding rings further include a metal ring secured to the inner surface of said elastic material ring part.

4. The improved Belleville disk spring assembly of claim 1 wherein said securing means comprise a U-shaped channel.

5. The improved Belleville disk spring pillar assembly of claim 4, wherein the binding rings comprise plate rings and the U-shaped channels of said holding flanges comprise circumferential grooves in the outer portions of said plate rings adapted to receive the corresponding rims of the Belleville disk springs.

6. The improved Belleville disk spring pillar assembly of claim 5, wherein at least a part of the binding rings comprises an elastic material.

7. The improved Belleville disk spring pillar assembly of claim 6, wherein the binding rings further include a metal ring secured to the inner surface of said elastic material ring part.

8. An improved spring pillar assembly of Belleville disk springs, the improvement comprising tensile and pressure load receiving binding rings including circumferential groove type holding flanges adapted to alternately bind the outer and inner rims of one package of Belleville disk springs to the corresponding rims of an adjacent package of Belleville disk springs in a tensile and pressure load transmitting relationship.

9. The improved Belleville disk spring assembly of claim 5 wherein the U-shaped channel comprises a circumferential groove.

* * * * *